(12) United States Patent
Dohan

(10) Patent No.: US 10,144,346 B1
(45) Date of Patent: Dec. 4, 2018

(54) VOICE-RECOGNITION/VOICE-ACTIVATED VEHICLE SIGNAL SYSTEM

(71) Applicant: Jewel L. Dohan, Newport Beach, CA (US)

(72) Inventor: Jewel L. Dohan, Newport Beach, CA (US)

( * ) Notice: Subject to any disclaimer, the term of this patent is extended or adjusted under 35 U.S.C. 154(b) by 0 days.

(21) Appl. No.: 15/942,437

(22) Filed: Mar. 31, 2018

(51) Int. Cl.
*B60Q 1/34* (2006.01)
*G10L 15/22* (2006.01)

(52) U.S. Cl.
CPC ............ *B60Q 1/34* (2013.01); *G10L 15/22* (2013.01); *B60Q 2900/30* (2013.01); *G10L 2015/223* (2013.01)

(58) Field of Classification Search
CPC ......... B60Q 1/34; B60Q 290/30; G10L 15/22; G10L 2015/223

USPC .......................................................... 340/475
See application file for complete search history.

(56) References Cited

U.S. PATENT DOCUMENTS

2018/0056858 A1* 3/2018 Cunningham, III ... G08G 1/168

* cited by examiner

*Primary Examiner* — Ojiako K Nwugo
(74) *Attorney, Agent, or Firm* — Alexander Chen, Esq.; Inhouse Co. Law Firm

(57) ABSTRACT

A control system is operable within a host vehicle to control the operation of signaling apparatus indicative of a driver intent to execute right, left or U-turn actions. The control system includes a voice recognition circuit for activating turn signal devices within the vehicle. In some embodiments, a wireless link facilitates aftermarket applications while in other embodiments original equipment manufacturer is accommodated.

1 Claim, 12 Drawing Sheets

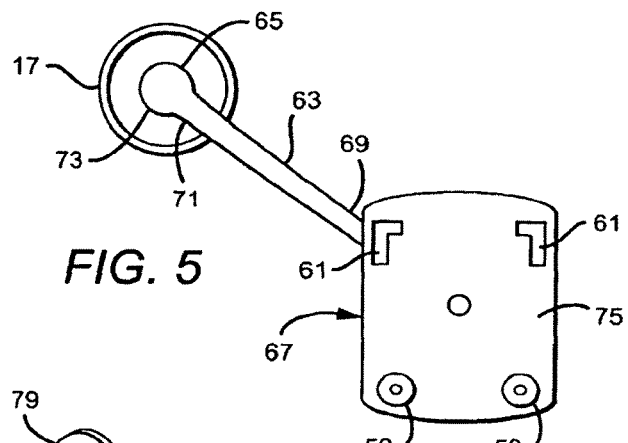
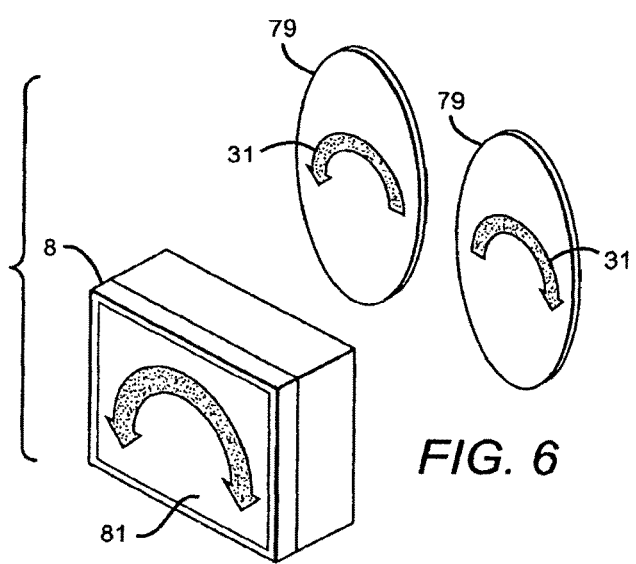
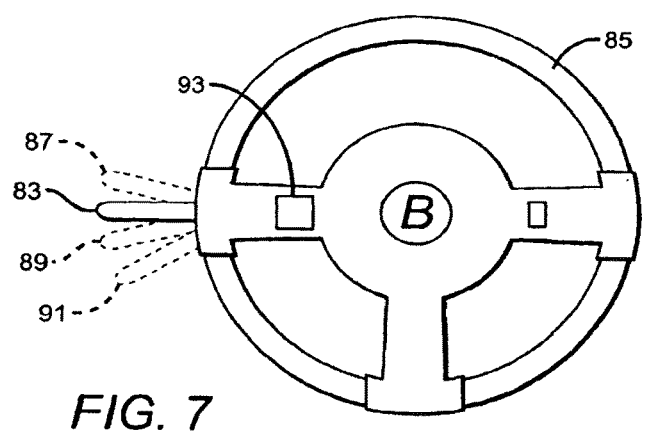
FIG. 5
FIG. 6
FIG. 7

VOICE-RECOGNITION/VOICE-ACTIVATED VEHICLE SIGNAL SYSTEM

FIELD OF USE

This invention relates generally to the field of vehicle safety devices and more particularly relates to vehicle safety devices utilized in a vehicle to indicate the driver's desire to make a right, left or U-turn.

BACKGROUND

One of the problems facing many drivers is the lack of signaling before making turns or changing lanes. Frequently, drivers making right or left turns in a marked lane mistakenly believe that signaling is unnecessary. In particular, drivers will not signal if they are in a designated turn lane. In addition to general failure by drivers in signaling right or left turns, drivers making U-turns in left turn designated lanes are generally unable to signal their intent.

In many instances, drivers attempt to use left or right turn signals to indicate an intention to make a U-turn. Unfortunately, left or right turn signals are not effective in alerting oncoming or following vehicles that the driver intends to make a U-turn. Hence, following drivers may believe that the driver in front of them is actually making a standard left turn and respond accordingly. However, the larger arc required for a U-turn often intrudes into the path of unsuspecting drivers and endangers both vehicles. The oncoming traffic, whether on a side street without traffic signals or at a controlled intersection are likewise uninformed and unaware that the signaling driver's intention is to make a U-turn and not a left turn. Many traffic accidents occur in this manner.

In many instances it has been found that drivers, particularly less experienced ones, often neglect to utilize the turn signal apparatus on their vehicle due in part to a reluctance to remove one hand the steering wheel and other controls of the vehicle in order to initiate appropriate turn signals on the vehicle. While practitioners in the vehicle arts have endeavored to place controls such as turn signal controls at convenient places for easy access by drivers, this reluctance has nonetheless persisted. Also, it has been found that there is a tendency on the part of many drivers, again particularly less experienced drivers, to be temporarily distracted from observing the road and areas surrounding the vehicle as they drive when access to a turn signal is sought. Even experienced drivers often involuntarily take their eyes off of the road to glance down at turn signal controls during activation thereof. As a result, even the best of vehicle turn signal apparatus available in the marketplace is subject to shortfalls and limitations and is by no means an ideal apparatus.

The foregoing limitations and shortcomings of presently available vehicle turn signal apparatus has prompted practitioners in the art to endeavor to provide a variety of improved signaling apparatus for motor vehicles.

For example, practitioners in the art have endeavored to provide a variety of signaling apparatus which addresses the need for indicating the intention of a driver to execute a U-turn. For example, U.S. Pat. No. 4,868,541 issued to Sullivan, et al. sets forth a U-TURN SIGNAL DEVICE having a U-turn indicating light signal array mountable upon a vehicle which is operative in response to a remotely produced transmitted signal within the vehicle. The transmitter and receiver coupling link is provided by an ultrasound communication apparatus. The apparatus provides for a transmitting and sending unit which may be adhesively mounted at a convenient point within the vehicle. The receiving unit is coupled to a set of lighted displays which in turn may, for example, be mounted in the rear window of the host vehicle.

U.S. Pat. No. 6,195,001 issued to Haddad, et al. sets forth an AUXILIARY SIGNAL TO INDICATE a U-TURN in which a U-turn signal indicating light apparatus is supported within the vehicle interior proximate the vehicle rear window. A remote radio frequency transmitter is situated within the driver's access and is operated by manual switching to produce a radio frequency signal which activates a radio frequency receiver coupled to the U-turn signaling device. When the transmitter is activated by the vehicle driver, an activating signal is transmitted to the signal receiver which in turn activates the light signaling apparatus for a predetermined time period.

U.S. Pat. No. 7,417,534 issued to Quach, et al. sets forth a U-TURN SIGNAL DEVICE FOR MOTOR VEHICLES having a "double-sided" signal array operative in response to a wireless communication link. The vehicle operator triggers the energizing of the signal array utilizing a manual switch within the vehicle cockpit. The switch apparatus energizes a wireless communication transmitter which in turn energizes the power system of the U-turn indicating light signal array. The light signal array is double-sided and is thus visible for vehicles which are approaching and vehicles which are following the host vehicle. U.S. Pat. No. 5,003,289 issued to Roman sets forth a U-TURN SIGNAL ATTACHMENT having a lighted U-turn indicating device supported within the vehicle interior at a place visible to drivers outside the vehicle. The light signaling device is energized by a manual switch activated by the driver within the vehicle cockpit.

U.S. Pat. No. 5,663,708 issued to Strawn sets forth a U-TURN SIGNAL APPARATUS having a switching apparatus activated by a conventional turn signal lever which is movable to a second position. The turn signal lever is thus capable of being moved to conventional positions indicating right turn and left turn signaling as well as further positions which indicated U-turn signaling. AU-turn signal indicator is provided on the vehicle dashboard in addition to conventional left and right turn signaling indicators.

In further attempts to improve the general operation of turn signal indicators within vehicles, practitioners have provided additional refinements in response to specific situational needs. For example, U.S. Pat. No. 6,970,074 issued to Perlman sets forth a WIRELESS REMOTE VEHICLE SIGNALING INDICATOR FOR SUPPLEMENTING EXISTING VEHICLE SIGNAL INDICATORS having additional lighted signal indicators which may be secured to a suitable surface of a vehicle, such as a side view mirror, and which are wirelessly coupled to the vehicle signaling system. This wireless coupling is accomplished by a radio frequency communication device operatively coupled to the turn signal apparatus of the vehicle and energized in combination therewith. The transmitting device produces a turn indicating activation signal when the conventional turn signal apparatus of the vehicle is operated by the driver. The remote lighted indicating device includes a wireless receiver which activates the signal indicating device in response to the transmitted signal. In this manner, additional wiring of the vehicle in order to provide such auxiliary turn signal lighting is not required.

U.S. Pat. No. 5,424,715 issued to Lietzow, et al. sets forth a WIRELESS TAILLIGHT SYSTEM suitable for use in environments such as towed trailers or wagons. The system includes a wireless transmitter operative within the vehicle together with a remote wireless receiver and turn signal light indicating apparatus mounted to the towed vehicle. A feedback apparatus confirms to the transmitting unit that the remote turn signal apparatus has been successfully activated when the user operates the transmitter.

Published U.S. Patent application US 2008/0258899 filed by Stiles, et al. sets forth a TRANSMITTER APPARATUS AND SYSTEM FOR REMOTE SIGNALING having a driver operated control panel supported within the vehicle together with a remote turn signal indicating apparatus secured to a towed vehicle. A wireless communication link is provided between the operator console and the remote signal indicating unit. In one embodiment, a user keypad comprises the control panel which is supported on the steering wheel column behind the steering wheel for convenient access. In a typical user environment, the towed vehicle comprises a wagon or trailer to which the remote signaling apparatus is attached.

In an art generally related to the present invention, practitioners have provided a variety of devices which respond to the human voice and which are utilized in operating electronic equipment or the like. For example, U.S. Pat. No. 6,518,889 issued to Schlager et al. sets forth a VOICE ACTIVATED PERSONAL ALARM having a voice activation circuit and a radio transmitter configured by a personal alarm system remote unit having a radio transmitter and receiver and for providing two-way communication, a navigation receiver for providing navigational information, a demodulator for demodulating the received navigation information, timing circuits for providing precise time of day determination and a voice activated detector having a output signal activated by the detection of a predetermined distress fraise.

U.S. Pat. No. 5,850,627 issued to Gould et al. sets forth APPARATUSES AND METHODS FOR TRAINING AND OPERATING SPEECH RECOGNITION SYSTEMS which is able to respond to the input of a character string from a user by limiting the words it will recognize to words having a related but not necessarily identical character strain.

U.S. Pat. No. 5,71,328 issued to Fitzpatrick et al. sets forth a METHOD AND APPARATUS FOR AUTOMATIC CREATION OF A VOICE RECOGNITION TEMPLATE ENTRY having means for automatically assembling a plurality of commands received by the data processing system at least one of the commands having a voice recognition criteria component associated therewith. The system constructs a voice recognition templet entry by associating the assembly voice recognition criteria components with the assembled plurality of commands.

U.S. Pat. No. 5,602,963 issued to Bissonnette et al sets forth a VOICE ACTIVATED PERSONAL ORGANIZER which sets forth a small portable handheld electronic personal organizer having voice recognition operative upon words spoken by a user to input data into a organizer and record voice messages from the user. The spoken words and voice messages via a microphone and are data compressed.

U.S. Pat. No. 5,335,276 issued to Thompson et al.sets forth a COMMUNICATION SYSTEM AND METHODS FOR ENHANCED INFORMATION TRANSFER having voice activation and voice control capabilities included within communication devices to perform the same functions as the touch sensitive visual display therein. The communication device includes a built-in modem, audio input and output, telephone jacks and wireless communication.

U.S. Pat. No. 5,239,586 issued to Marui sets forth a VOICE RECOGNITION SYSTEM USED IN TELEPHONE APPARATUS having a handset, a hands free microphone for generating an input audio signal, a high pass filter for eliminating low frequency components from the signal, a signal lever controller for adjusting the level of high pass signal in response to the user handset or hands free microphone and means for recognizing the user utterance.

U.S. Pat. No. 5,231,670 issued to Goldhor et al. sets forth a VOICE CONTROLLED SYSTEM AND METHOD FOR GENERATING TEXT FROM A VOICE CONTROLLED INPUT that divides the processing of each speech event into a dictation event and a text event for separate parallel processing.

U.S. Pat. No. 4,706,243 issued to Noguchi sets forth a SINGLE-CHANNEL PER-CARRIER COMMUNICATION SYSTEM INCLUDING A VOICE-ACTIVATED TRANSMISSION POWER CONTROLLER usable in satellite communications.

U.S. Pat. No. 5,452,332 issued to Otani et al. sets forth a AGC CIRCUIT FOR BURST SIGNAL having an automatic game control operative upon the process signal for controlling variations in loop gain of the demodulators carrier recovery circuitry to provide stable demodulation.

While the foregoing described prior art devices have to some extend improved the art and have in some instances enjoyed commercial success, there remains nonetheless a continuing need in the art for a more effective, affordable, user friendly and safety oriented system for operation in a motor vehicle which facilitates the communication by the driver of intentions to other surrounding and approaching motor vehicles.

In the past seven years that this art has been in circulation, the motor vehicle industry has changed rapidly towards a more autonomous level, giving the driver the role of more of an analyst and software expert than driver. Electronics have become smaller, more economical, and durable such that we have seen it become commonplace for automobiles to have factory installed computers and interfaces. These integrated consoles serve all manner of function, primarily GPS and radio and audio controls, but we are seeing them incorporating the vehicles climate control, displaying feedback about gas efficient, operating as a multimedia center, and even featuring internet connectivity and browsing.

Further, in the last several years, Apple's Siri, Amazon's Alexa, and Google's voice interface has proven that speech recognition technology has improved to a point such that it is dependable and useful, and consequently desirable to consumers.

As the public becomes more familiar and comfortable with speech recognition and audible commands, so to do we see that audible commands are becoming more omnipresent in multiple industries particularly those where a person is engaged in multiple tasks concurrently, or faced with large amounts of data and expected to make decisions and react quickly.

As such, it becomes desirable to apply this technology towards the automotive industry. Through the application of this art a driver would be given a high potential of distinct commands that could then be given to a ODB II sensor that will begin to be integrated into not only vehicles but also inclusive of the IoT (Internet of Things).

Further, as the public has become dependent and even infatuated with smart-phone's and the internet, distracted driving has become an issue we are seeing more municipalities adopting laws and mandatory penalties to combat. As such, the ability for a driver to direct potentially an entire library of tasks towards his or her automobile while paying attention to the road and the immediate tasks at hand would immediately and effectively address this subject which has now become an area of concern.

SUMMARY OF THE INVENTION

It is a general object of the present invention to provide an improved directional signal system for use in a vehicle. It is a more particular object of the present invention to provide an improved signaling apparatus for use in a vehicle which facilitates a hands free operation of the vehicle signaling system and which facilitates the signaling an intent to execute a U-turn.

In accordance with the present invention there is provided a voice operated signal system comprising: a microphone for converting audible information to voice signals; a voice recognition system having means for decoding the voice signals and producing activation signals corresponding to U, right and left turn signal commands within the voice signals; coupling means for coupling the voice signals to the voice recognition system; U-turn signal means for signaling a U-turn; right turn signal means for signaling a right turn; and left turn signal means for signaling a left turn, the voice recognition system selectively activating the U-turn signal means, the right turn signal means or the left turn signal means in response to the voice commands. From another perspective the present invention provides for use in a vehicle a method of signaling a driver's intention to other proximate drivers, comprising the steps of: providing U-turn signal means for signaling a driver intention to make a U-turn; providing right turn signal means for signaling a driver intention to make a right turn; providing left turn signal means for signaling a driver intention to make a left turn; providing a voice recognition controller having a voice input and means for decoding voice commands from the voice input; activating the U-turn signal means, the right turn signal means for the left turn signal means in response to the voice commands; and timing the activating to a predetermined time interval. In a still different sense, the present invention is provided for use in a vehicle having right and left turn signal systems, a vehicle signal system comprising: a microphone; a right and left turn signal interface coupled to the vehicle signal system able to activate either of the right or left signal systems; a U-turn signal system for indicating a driver intention to execute a U-turn; a voice recognition system having activation outputs coupled to the right and left turn signal interface and the U-turn signal system and an input coupled to the microphone; a command decoder operative within the voice recognition system to decode U-turn, right turn and left turn signal commands and to provide corresponding activation signals to the right and left turn signal interface and the U-turn signal system; and means for deactivating the U-turn, right turn and left turn signal systems.

In addition to the above described system and components, a functional kit will be provided that provides the user with an onboard microphone unit, an app (iOS and Android) with an interface to allow the user to have overall control of the microphone controls as well as the ability to set and/or toggle keywords that would initiate the sequences for turning.

To enable connectivity, a Bluetooth connection is established between the app and the onboard kit which in turn is paired with the additional lights to be included at the rear of the vehicle.

The car will be equipped with a ODBII interface which in turn connects to the vehicles' existing on-board system and receives the Bluetooth connection. A Bluetooth connection is established between the smartphone and the app.

Upon startup, the app is self-driven and will automatically pair with the components and synch. Once the app is fully synced the app interface will then guide the user in a step-by-step setup process that establishes overall connectivity experience for driver and vehicle. The driver will be given the option to generate a key command word that will instigate the turning command sequence. The key command word is a fully customizable word or phrase that adds another level of security in the turning process. Additionally, the interface can in the alternate use the microphone already integrated in the user's phone. Should the user elect to instead use their own phone's microphone, the app will run the additional step of asking for permission to utilize the phone's integrated microphone. Once the user grants full access to the app the microphone will be able to decode the user's audible commands, and initiate the sequencing of the appropriate turn signal which is paired to that particular key command word or phrase.

To operate, the user speaks the key command word, which is received by the microphone and decoded by the smartphone app, upon which the phone by way of the ODBII Bluetooth connection is able to send the signal through the ECU and create the desired signal through the either the vehicle's existing external lights or through the provided light kit. In one aspect of the invention, for use in a vehicle, a voice operated signal system comprising: a platform hosted by a smart phone computer; a microphone on the smart phone for converting audible information to voice signals; a voice recognition module having means for decoding the voice signals and producing activation signals corresponding to U, right and left turn signal commands within the voice signals; a ODBII connector that connects to a vehicle via a ODBII port of the vehicle; the ODBII connector is coupled to the platform wirelessly via Bluetooth; the voice activation module activates the vehicle's left turn signal and right turn signal via the ODBII port; an external U-turn light apparatus; the voice activation module send the U turn signal command to the external U-turn apparatus; the external U-turn light apparatus is coupled to the platform via Bluetooth. In another aspect of the invention, For use in a vehicle, a voice operated signal system comprising: a platform hosted by a smart phone computer; a microphone on the smart phone for converting audible information to voice signals; a voice recognition module having means for decoding the voice signals and producing activation signals corresponding to U, right and left turn signal commands within the voice signals; an external U-turn light apparatus coupled to the platform via Bluetooth; an external left turn apparatus coupled to the platform via Bluetooth and an external right turn apparatus coupled to the platform via Bluetooth; the voice activation module activates the vehicle's left turn signal wirelessly to the external left turn apparatus; the voice activation module activates the vehicle's right turn signal wirelessly to the external right turn apparatus; the voice activation module activates the vehicle's U turn signal wirelessly to the external U turn apparatus. In yet another aspect of the invention, a voice operated signal system comprising: a platform hosted by a smart phone computer; a microphone on the smart phone for converting audible information to voice signals; a voice recognition module having means for decoding the voice signals and producing activation signals corresponding to U, right and left turn signal commands within the voice signals; an external U-turn light apparatus; the voice activation module send the U turn signal command to the external U-turn apparatus; the external U-turn light apparatus is coupled to the platform via Bluetooth; a switch toggle device coupled to the platform via Bluetooth wherein the switch toggle is coupled to a vehicle's left and right turn signal switch wherein the voice activation module send the left and right turn signal commands to the switch toggle wherein the switch toggle thereby activates the vehicle's left and right turn signal switch. In one embodiment, the voice commands each include a command word common to all of the voice commands and wherein the voice recognition system includes means for responding solely to voice commands including the command words. In one embodiment the voice recognition system includes timer means for limiting the activation of the U-turn signal means, the right turn signal means and the left turn signal means to a predetermined time interval. In one embodiment the voice commands further include a stop command and wherein voice recognition means includes stop means for terminating the activation of the U-turn signal means, the right turn signal means or the left turn signal means when the stop command is decoded regardless of the time interval. In one embodiment the coupling means include a wireless communication link. In one embodiment the voice commands each include a command word common to all of the voice commands and wherein the voice recognition system includes means for responding solely to voice commands including the command words. In one embodiment the voice recognition system includes timer means for limiting the activation of the U-turn signal means, the right turn signal means and the left turn signal means to a predetermined time interval. In one embodiment the voice commands further include a stop command and wherein voice recognition means includes stop means for terminating the activation of the U-turn signal means, the right turn signal means or the left turn signal means when the stop command is decoded regardless of the time interval. In one embodiment the coupling means include a wireless communication link. In one embodiment the coupling means include a wireless communication link. In one embodiment the voice commands each include a command word common to all of the voice commands and wherein the voice recognition system includes means for responding solely to voice commands including the command words. In one embodiment the voice recognition system includes timer means for limiting the activation of the U-turn signal means, the right turn signal means and the left turn signal means to a predetermined time interval. In one embodiment the voice commands further include a stop command and wherein voice recognition means includes stop means for terminating the activation of the U-turn signal means, the right turn signal means or the left turn signal means when the stop command is decoded regardless of the time interval. In one embodiment the coupling means include a wireless communication link.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 5 sets forth a side perspective view of the attachment apparatus of the present invention vehicle safety device;

FIG. 6 sets forth a front perspective view of a vehicle safety device constructed in accordance with the present invention having interchangeable image elements;

FIG. 7 sets forth a front view of a vehicle steering wheel illustrating the use of the present invention vehicle safety device;

DETAILED DESCRIPTION OF ILLUSTRATIVE EMBODIMENTS

The figures below set forth various embodiments of the present invention. Each embodiment shows the invention from a different perspective.

Figure 1:
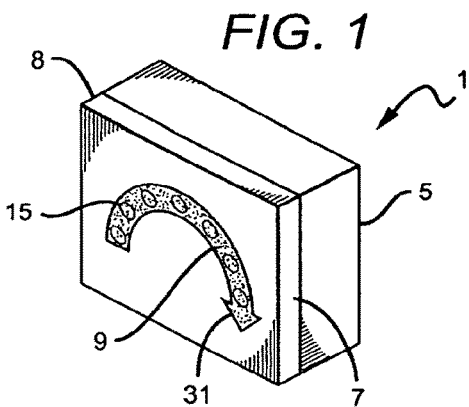
FIG. 1 sets forth a front perspective view of a vehicle safety device constructed in accordance with the present invention.

FIG. 1 sets forth a perspective view of a vehicle safety device generally referenced by numeral 1. Safety device 1 includes a container means 5 and houses safety device 1 and its associated hardware. The Container means 5 includes a receiving unit 7 which includes a flashing signal 9. In its preferred fabrication, flashing signal 9 is constructed to signal a selected one of a plurality of directional instructions.

Figure 2:
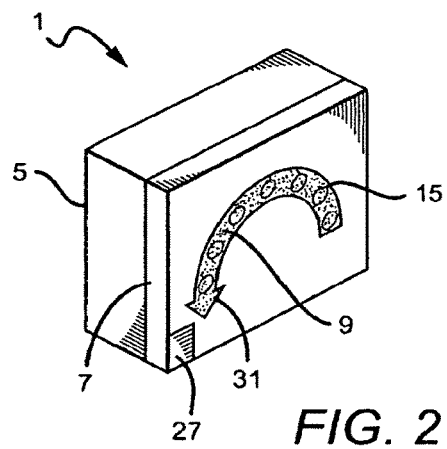
FIG. 2 sets forth a further front perspective view of a vehicle safety device constructed in accordance with the present invention.

It will be apparent to those skilled in the art that while preferred embodiments utilize a U-turn flashing signal 9 wherein the U-turn is typically made as a left turn, in that for markets where drivers drive on the opposite side of the street (such as the United Kingdom), the U-turn signal may be configured to show an appropriate (right turn) U-turn signal as illustrated in FIG. 2.

Figure 3:
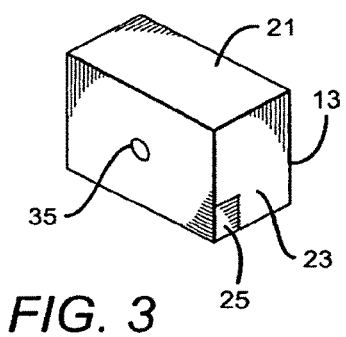
FIG. 3 sets forth a front perspective view of an actuator unit having a reminder light for the present invention safety device.

Continuing in FIG. 1, safety device 1 is supported within container means 5. Container means 5 may be constructed of any suitable material including plastic, metal, wood, polyurethane and the like, In the embodiment of the present invention shown in FIG. 1, container means 5 is preferably constructed of a high temperature resistant plastic material. The use of a high temperature resistant plastic material is advantageous due to the high temperatures that are sometime encountered interior areas of vehicles exposed to sunlight. In a typical use, container means 5 is placed within a vehicle in an exposed area such as the rear window deck. A sending unit 13 as shown in FIG. 3 is linked to safety device 1. Receiving unit 9 further includes a plurality of signal lights 15 which are activated when an appropriate signal from sending unit 13 is received. The lights are illuminated to indicate the driver's intention to make a U-turn.

As mentioned above, safety device 1 having receiving unit 9 (shown in FIGS. 1 and 2) is typically placed in the rear window of a host vehicle (not shown), at a location which provides visibility to drivers of vehicles behind the host vehicle to be able to observe the flashing of signal lights 15. Alternatively, safety device 1 may be placed in the front windshield of a vehicle (not shown) wherein the flashing lights 15 within device 1 may be visible to vehicles ahead and to the periphery of the host vehicle signaling a U-turn. Flashing lights 15 may utilize a plurality of colored bulbs including yellow, amber, red or any other color to signal a U-turn. The configuration of the bulbs may be designed utilizing a series of light emitting diodes (LEDs) or a single light. Additionally, device 1 may utilize a cover plate 8 which may allow the image of the U-turn to be isolated. Cover plate 8 is further illustrated in FIG. 6. It should be noted that the exterior shaping of receiving unit 7 may be customized to any shape such as round, square, heart and/or in the shape of letters, numbers, etc.

U-turn device 1 may be attached to a windshield (not shown) by a swivel suction cup 17 illustrated in FIG. 5. This allows device 1 to be positioned in a manner which maximizes its visibility to other drivers.

FIG. 3 sets forth a perspective view of a sending unit 21 which is operative to send signals to receiving unit 9. Sending unit 21 includes a housing 23 which contains a signal transmitter 25. Signal transmitter 25 is linked to receiving unit 9 which in turn activates flashing lights 15 of safety device 1 indicating that the driver wishes to make a U-turn. In the preferred embodiment of the present invention, transmitter 25 uses a radio frequency transmission to send activation signals to receiving unit 25. Receiving unit 9 includes a corresponding signal receiver 27 incorporated into the receiving unit 9 whereby the receiving unit 9 may receive activation signals to transmitter 25 and activate flashing lights 15.

Sending unit 21 includes a wireless control portion (shown below) which when actuated, sends a signal to receiving units placed in front and the rear of the host vehicle. The U-turn symbol, preferably exhibiting an arrow 31 as illustrated in FIGS. 1 and 2, may then flash in the receiving device to alert oncoming and following vehicles of the driver's intent to make a U-turn. In the preferred fabrication of the present invention, sending unit 21 includes a flashing light 35 to assure the driver that the signal has been properly transmitted to the receiving units located inside the vehicle. When the driver has completed his U-turn or decides against making a U-turn and wishes to turn safety device 1 off, the driver simply turns off device 1 manually by actuating a switch. Alternatively, a timer similar to the turn signal timers currently employed in most vehicles may be used. Additionally, safety device 1 may be deactivated or turned off using dedicated timing mechanism wherein the expiration of a predetermined period of time automatically resets the off state. In an illustrative embodiment, the unit may be pre-set to turn off after a fixed time automatically if not manually turned off by the user. In yet another embodiment, the unit may be deactivated or turned off by voice activation. After the U-turn has been completed, the unit may be turned off by voice command of the user.

Remote device 21 may be attached to any part of the host vehicle including the dashboard, visor, or any other interior area. Remote device 21 may be attached to the interior of the vehicle with an adhesive component or clip (not shown).

Remote device 21 may be a radio frequency (RF) activated circuit that sends a UHF signal which does not require line of sight transmission. The circuitry of remote device 21 may be housed in a plastic or metal container and powered by a battery. Other types of power sources may be utilized including tapping into the power supply of the vehicle. The RF, UHF or any other utilized transmitting signals will not interfere with other vehicles in close proximity of the device utilized vehicle. In an exemplary embodiment, the LED light bulb may be seen up to or beyond an intersection. Also, a solar power system may be used to power the safety device.

Figure 4:
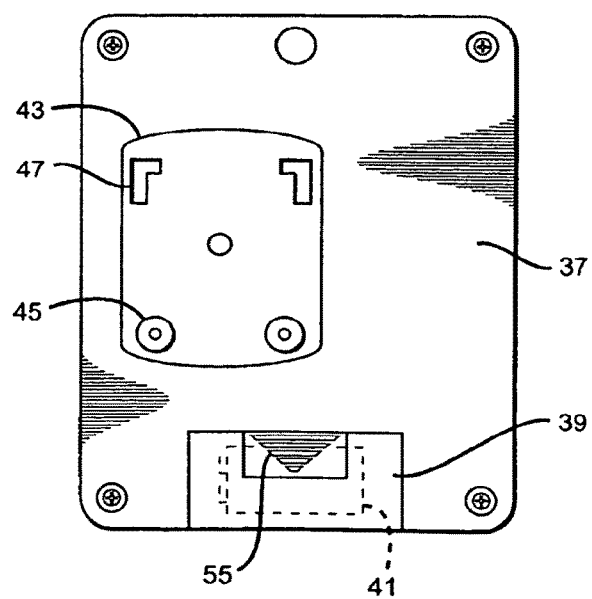
FIG. 4 sets forth a rear view of the present invention vehicle safety device.

FIG. 4 shows a back portion 37 of safety device 1. Safety device 1 may be powered by a power source 39 such as a battery 41. Additionally, back portion 37 includes an attachment means 43 which allows for attachment of the safety device 1 to the windshield or other surface of a host vehicle. Attachment means 43 may for example utilize an adhesive. Additionally, attachment means 43 may include a suction cup 45 and/or a connection point 4 7 for attachment to a swivel arm 51 illustrated in FIG. 5.

FIG. 5 sets forth a swivel cup connector 17 which connects safety device 1 or the send unit 21 to a surface of the interior of a host vehicle. Swivel cup connector 17 further includes a plurality of suction cups 59 to attach the connector to safety device 1. Additionally, the connector may have a plurality of different connection means 61 to be detachably connected to the device including adhesives, screws, snapons among others. By further variation, an arm 63 may be adjustable to move and to fit any desired space. Moreover the arm 63 may allow for moving the unit about connector 17 such that the device may be moved, adjusted or rotated for maximum visibility by surrounding vehicles. Arm 63 may includes a first connection point 65 at a first end 71 of arm 63 and second connection point 67 at end 69 of arm 63. First connection point 65 and the second connection point 67 may be adapted to be removably attached to a first contact portion 73 and a second contact portion 75. The first contact portion 73 may be attached to the interior portion of a vehicle, wherein second contact portion 75 may be attached to safety device 1. Safety device 1 may be moved from vehicle to vehicle. In such event, the entire arm assembly 17 would not need to be removed from the vehicle. If desired, a user could simply remove the second contact portion 75 and withdraw the device 1 from the vehicle and place it in another vehicle leaving the arm 62 and other contact portions still intact in the original vehicle.

FIG. 6 sets forth safety device 1 having a cover plate 8. Safety device 1 includes a pair of light-transmissive arrows 32 supported on cover plate 8. An insert 79 is placed in a position behind cover plate 8. Insert 79 includes a blacked out portion such as light-transmissive arrow 31 which indicates a desired direction of U-turn. In practice, insert 79 is reversible and may be placed behind front portion 81 of safety device 1 and cover plate 8 in either of two orientations and in registry with arrows 31. Insert 79 is shown in opposite orientations in FIG. 6. The orientation of insert 79 is chosen to properly indicate either a conventional U-turn or an opposite direction U-turn by reversing insert 79. Thus, the present invention device achieves manufacturing economy by avoiding the need for manufacture of two opposite direction devices.

FIG. 7 illustrates a typical turn signal switch lever 83 of the type used in most vehicles. Typically, turn signal switch lever 83 is located to the left of a steering wheel 85 and is connected to the vehicle steering column (not shown). When a driver desires to make a right turn, the driver will move the switch upwardly to position 87. Conversely, when the driver desires to make a left turn, the driver moves switch lever 83 in the downward direction to position 89. In accordance with the present invention, the driver desiring to make aU-turn simply moves the switch to a further downward position such as position 91. Thereby, the use of the existing turn signals and integrated U-turn signal and a side view mirror (both the front portion and the rear portion of the mirror) may be wirelessly or hardwired to the car's electrical system and effectuated with simple further movements of a commonly used indicator switch 83 located in most vehicles.

Additionally, FIG. 7 further illustrates the voice activation microphone 93 that may be located on the steering wheel assembly itself. However, it should be understood that the microphone 93 may be located at any location in the interior portion of the vehicle. Whereby a driver desiring to make a U-turn may activate safety device 1 by simply instructing the device to activate. The voice activation system having a microphone 93 on the steering wheel 85 will, in the manner described below, activate safety device 1 to show the driver's intent to make a U-turn. As mentioned, the voice activated system is further illustrated and described below.

Figure 8:
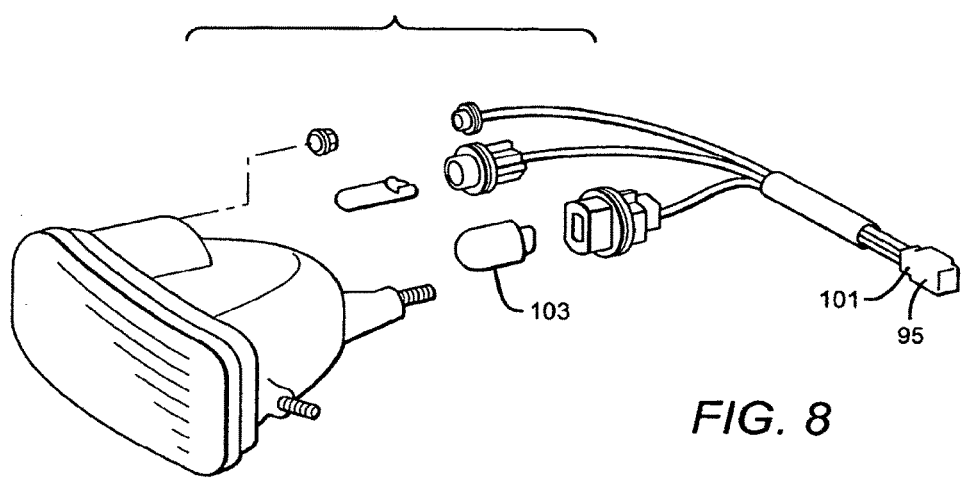
FIG. 8 sets forth a perspective view of the electrical system of the present invention vehicle safety device.

FIG. 8 illustrates the wiring of a one way RF system which is comprised of a transmitter (not shown) and a receiver chip 95 working at a high frequency such as 314 MHz. When the U-turn activation button is pushed a unique 8 bit device identity code is sent to the receiver. The receiver chip 95 decodes the received signal and presents it to a microcontroller 101. Once receiver 95 identifies the compatible code, a signal activates the timer which keeps LED flashing lights 103 of the U-turn device flashing for a period of time.

Figure 9:
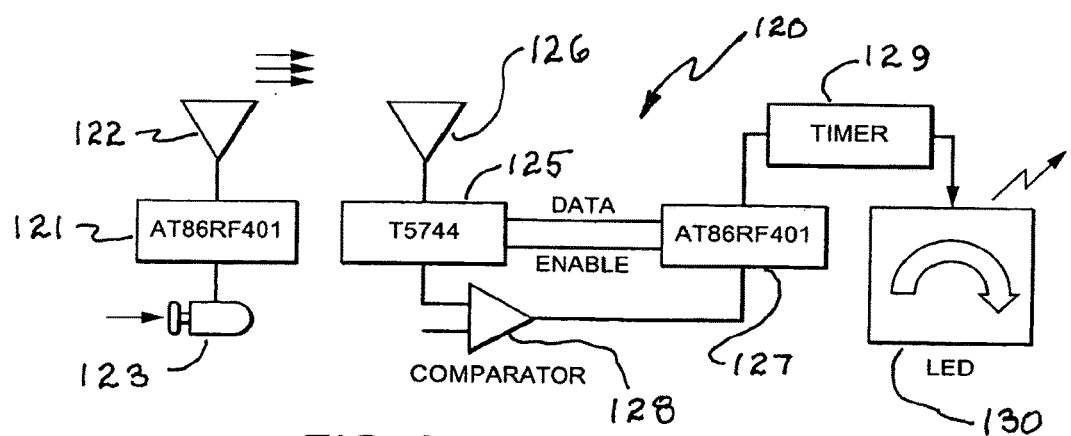
FIG. 9 sets forth a block diagram of an embodiment of the present invention vehicle safety device.

FIG. 9 sets forth a block diagram of a basic U-turn signal system operative in accordance with the present invention and generally referenced by numeral 120. U-turn signal system 120 includes a transmitting circuit 121 coupled to a transmitting antenna 122. A control button 123 is coupled to circuit 121 and provides manual control of the transmitting circuit. U-turn signal system 120 further includes a receiving circuit 125 coupled to a receiving antenna 126. Receiver circuit 125 includes a data coupling to a processor 127 and an enable signal link also coupled to processor 127. A comparator 128 is operatively coupled from receiver 125 to processor 127. The output of processor 127 is coupled to a timer 129 the output of which is coupled to a U-turn signal device 130. Signal device 130 may, for example, be the illuminated device set forth above providing a light signal indicating a U-turn intention.

In operation, the user activates transmitting circuit 121 by pressing button 123. Circuit 121 transmits a signal from antenna 122 to antenna 126 of receiver circuit 125. Receiver circuit 125 recovers the data information from the transmitted signal and provides data and enables signals to processor 127. Comparator 128 functions as a gain control circuit to maintain proper signal levels within processor 127. The activation signal for U-turn signal device 130 is coupled to device 130 via timer 129. Timer 129 retains the signal coupling for a predetermined time interval after which timer 129 no longer provides an activating signal to device 130 and signaling of U-turn intention ceases. The use of transmission link between transmitting circuit 121 and receiving circuit 125 of U-turn signal device 120 facilitates an aftermarket application for the present invention in that no wire connection is required between the transmitter and the receiver. This in turn allows the user to place the U-turn signal device including output device 130 at a convenient place such as the rear deck of the host vehicle and to place transmitter 121 together with manual button 123 at a convenient location such as the dashboard of the host vehicle.

Figure 10:
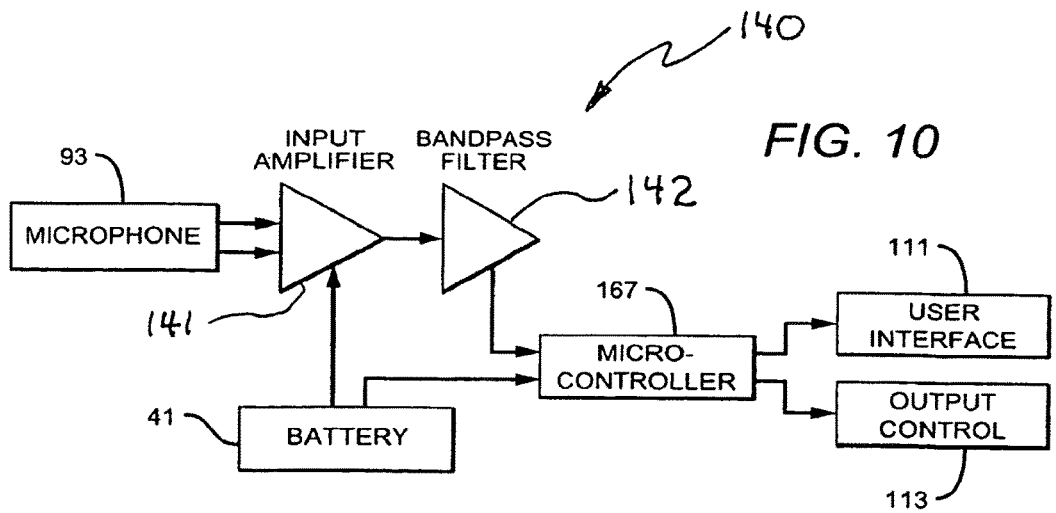
FIG. 10 sets forth a block diagram of a further embodiment of the present invention utilizing a voice activated system.

FIG. 10 sets forth a block diagram of an alternate embodiment of the present invention system generally referenced by numeral 140. System 140 is configured to provide application in an original equipment manufacturer (OEM) environment. Original equipment manufacturing refers to systems which are typically installed by vehicle manufacturers during the manufacturing process. In contrast, other systems are referred to "aftermarket" referring to systems which may be installed by users or service technicians after the vehicle manufacturer has been completed and the vehicle is ready for use. With respect to the embodiment of FIG. 10, system 140 includes a microphone 93 coupled to an input amplifier 141 which in turn is coupled to a bandpass filter 142. The output of bandpass filter 142 is coupled to a microcontroller 167 which in turn has outputs coupled to a user interface 111 and an output control 113. A conventional battery 41 provides operative power for the circuit components within system 140.

It will be apparent to those skilled in the art that system 140 employs a microphone 93 and thus is intended to provide a voice activation or voice recognition operation. Comparison of the systems shown in FIGS. 9 and 10 shows that microphone 93 functions in place of manual control 123 in system 120.

In operation, microphone 93 receives spoken commands provided by the user which produce output signals applied to amplifier 141. Amplifier 141 increases the power level of the detected voice signals and applies it to bandpass filter 142. Bandpass filter 142 limits the transmitted signals applied 142 to microcontroller 167 to signals having frequencies within the desired useful frequency range. In essence, bandpass filter 142 is selected to pass signals having frequencies within the audible range detected by microphone 93 while excluding spurious signals such as noise or the like. Microcontroller 167 functions in the manner described below to communicate operative control signals to output control 113 which correspond to the specific information found in the spoken commands detected by microphone 93. In this manner, microcontroller 167 provides voice activation and/or voice recognition functions.

Microcontroller 167 further operates user interface 111 to provide visual information suitable for informing the vehicle operator of system operation and condition. In the preferred fabrication of the present invention embodiment shown in FIG. 10, output control 113 comprises the turn signal apparatus within the host vehicle in the manner described below together with a suitable U-turn indicating signal such as signal device 130 shown in FIG. 9 as well as various signal devices set forth above in FIGS. 1 through 8.

In a typical sequence of operations, the user speaks a command into microphone 93 which produces voice signals amplified by amplifier 141 and pass through bandpass filter 142. Microcontroller 167 compares the signals received to voice signal information previously stored within the microcontroller. This comparison results in providing the appropriate control signals to user interface 111 and output control 113 to initiate the desired signal action corresponding to the voice command. For example, the output condition desired by correspond to a U-turn signal activation. Alternatively, right turn or left turn indicative signal apparatus may be operated in response to the spoken command. In this manner, the user operating the host vehicle is able to maintain full control and full intention to vehicle operation keeping both hands upon the steering wheel.

Figure 11:
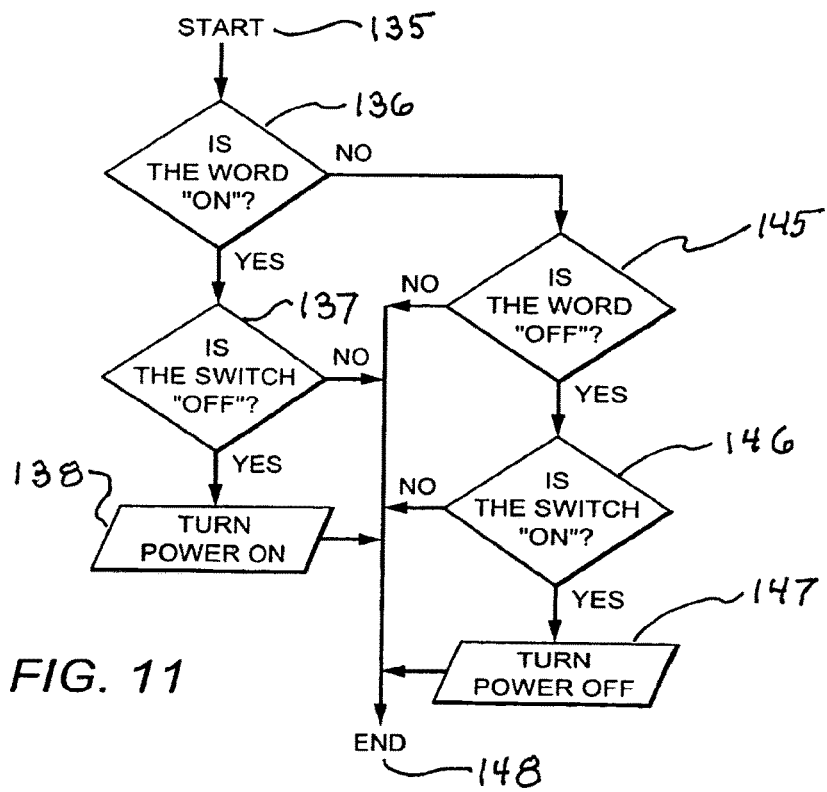
FIG. 11 sets forth a flow chart illustrating the signal sequence in an illustrative embodiment of the present invention.

FIG. 11 sets forth a flow diagram of the sequence of system operation for the present invention voice activated embodiments by which the system is able to activate and deactivate solely in response to voice commands. Thus the flow diagram of FIG. 11 may, for example, set forth the sequence of basic on/off operations controlling microcontroller 167 in the system of FIG. 10.

With specific attention to FIG. 11, the system operation is initiated at a start condition 135 in which the system waits for a voice command signal. Once a voice command signal is received and detected, the system moves to step 136 at which a determination is made as to whether the spoken word is an on command. If an on command is detected, the system moves to a step 137 at which a determination is made as to whether the system is inactive or off. In the event the system is inactive or off, the system to moves 138 turning the power on and activating the system. Thereafter, the system moves to end step 148 and ultimately returns to start step 135.

In the event a determination is made as step 136 that the word is not an on command, the system moves to step 145 determining whether the spoken word is an off command. In the event the detected command is an off command the system moves to step 146 determining whether the system is operating in an on condition. In the event the system is operating in an on condition, the system moves to step 147 turning the power off and returning to end step 148. Returning to step 137 in the event that the switch condition is not an off condition, the system returns to end step 148. Similarly, in step 145 a determination that the word command is not an off command causes the system to move to end step 148. Similarly, a determination at step 146 that the system is not in an on condition causes the system to move to end step 148. In this manner the present invention system functions to respond to voice commands and self activate in the event a command is detected.

Figure 12:
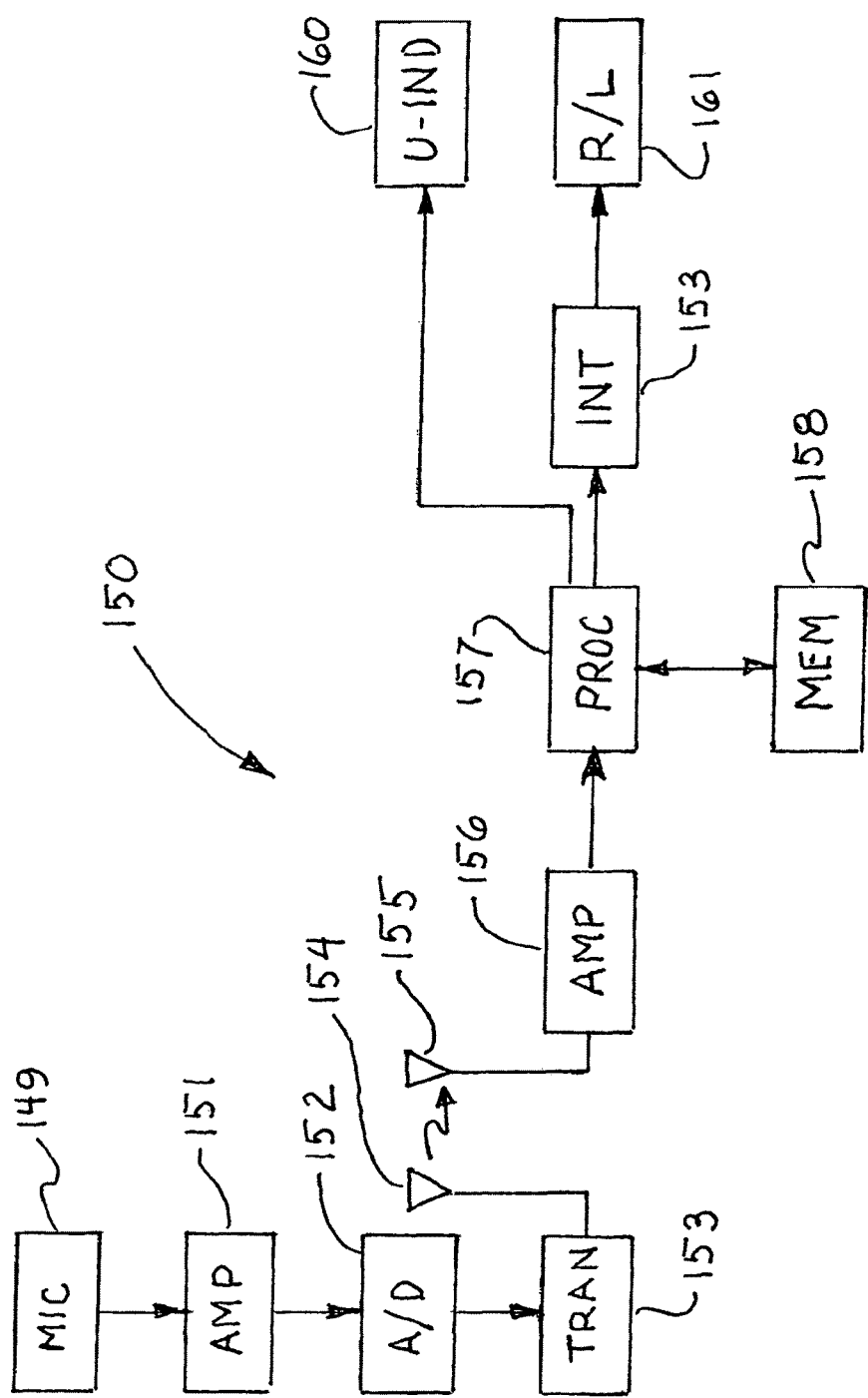
FIG. 12 sets forth a block diagram of an aftermarket embodiment of the present invention vehicle safety device utilizing voice recognition and wireless communication.

FIG. 12 sets forth a voice recognition, wireless, aftermarket embodiment of the present invention safety device generally referenced by numeral 150. Device 150 comprises a system which is primarily configured to be installed in an aftermarket environment which, as is described above, refers to circumstances in which a completed vehicle is enhanced by a technician or a user subsequent to vehicle manufacture. In this manner, the embodiment of the present invention system shown in FIG. 12 facilitates the upgrading of the safety signally apparatus of an otherwise conventional and complete vehicle. It is anticipated in the utilization of system 150 that the host vehicle be substantially conventional in manufacture in that it includes a conventional signally apparatus for right and left turn signaling by the user. It is further envisioned that system 150 be supplemented with a U-turn indicating device referenced by numeral 160. The result is a signal system within the host vehicle which provides enhanced safety, the capacity to do conventional signaling, the capacity to provide U-turn signal intention as well as a hands free operation of the system. This latter capability is particularly important in that driver of host vehicle is able to maintain two hands for steering and vehicle operation.

More specifically, system 150 includes a microphone 149 coupled to an amplifier 151 the output of which is coupled to an analog to digital converter 152. The output of converter 152 is coupled to the input of a transmitting circuit 153. A transmitting antenna 154 is coupled to the output of transmitting circuit 153.

System 150 further includes a receiving circuit and amplifier 156 having a receiving antenna 155 coupled to the input thereof. The output of receiving circuit and amplifier 156 is coupled to a voice recognition processor 157. Processor 157 further includes an associated memory 158 in communication therewith. System 150 further includes a vehicle interface 159 having outputs coupled to a right turn and left turn signaling circuit 161. A further output of voice recognition processor 157 is coupled to a U-turn indicating device 160.

In operation, the vehicle operator speaks a voice command received by microphone 149 which converts the command to electrical signals which are amplified to a sufficient power level by amplifier 151. The amplified signals are coupled to analog to digital converter 152 wherein the analog voice information signals are converted to corresponding digitally encoded signals. Transmitting circuit 153 receives the digitally encoded voice information from converter 152 and modulates it upon a convenient carrier signal for transmission from antenna 154. In this manner, the voice signals spoken by the vehicle user are converted to appropriate digitally encoded electronic signals which are transferred to the receiver portion of system 150.

The transmitted signals are received by receiving antenna 155 and applied to receiving circuit and amplifier 156. Receiving circuit and amplifier 156 recovers the digitally encoded voice information from the transmitted signal and passes the voice data to voice recognition processor.157. As voice data is applied to processor 157, processor 157 interacts with the stored information within memory 158 to convert the voice data to appropriate command signals. In voice recognition technologies, of the type which processor 157 employs, the stored information within memory 158 allows processor 157 to determine the particular voice information spoken by the vehicle user. It addition, the voice recognition technology is also able to employ user recognition and identification by comparing the received voice signals to stored reference signals within memory 158. In this manner, processor 157 is not only capable of determining what the command meaning are within the voice data but also capable of operating solely in response to voice commands which are spoken by one or more authorized recognizable voice inform~tio!l sources while excluding spoken commands from other individuals. Processor 157 responds to the detected voice information by activating the appropriate signal circuitry within the host vehicle. For example, in the event the vehicle user has spoken a command desiring the U-turn signal apparatus be activated, processor 157 determines this command meaning and activates U-turn signal indicator 160. Conversely, in the event that the command signal interoperated by processor 157 corresponds to a user command for a right turn signal or a left turn signal, processor 157 applies appropriate information signals to vehicle interface 159. The output of vehicle interface 159 is coupled to the existing right and left turn signal circuitry within the host vehicle. This coupling is undertaken in a convenient manner such as accessing the turn signal boards or wiring harness within the host vehicle. Of importance with respect to vehicle interface vehicle 159 is the capability to convert the output command signal of processor 157 into a suitable voltage and current level for application to the right and left turn signaling apparatus within vehicle system 161.

In the preferred operation of system 150 shown in FIG. 12, it has been found desirable to utilize a command word at the start of voice uttered command signals to aid the system in distinguishing voice commands intended to activate U-turn and right and left turn signaling from general conversation which might take place between occupants of the vehicle. Toward this end, the above mentioned well known voice recognition technology is operative to cause the system to respond solely to voice utterances from authorized vehicle operators. In addition however, it has been found advantageous to initiate each voice command with a keyword to be required by the system in responding. Thus, for example the initial word "command" may be utilized to perform this function. It will be apparent however that virtually any word distinguishable by the system may be utilized. However, utilizing the key word command simply requires that the user initiate a voice command to the system by simply stating "command U-turn" to signal an intent to activate the U-turn signaling apparatus of the system. Similarly, a voice utterance "command right turn" provides activation of right turn signal apparatus and finally the voice utterance "command left turn" activates left turn signaling by the system. In this manner accidental or inadvertent conversational triggering of signal apparatus of the host vehicle is avoided.

Figure 13:
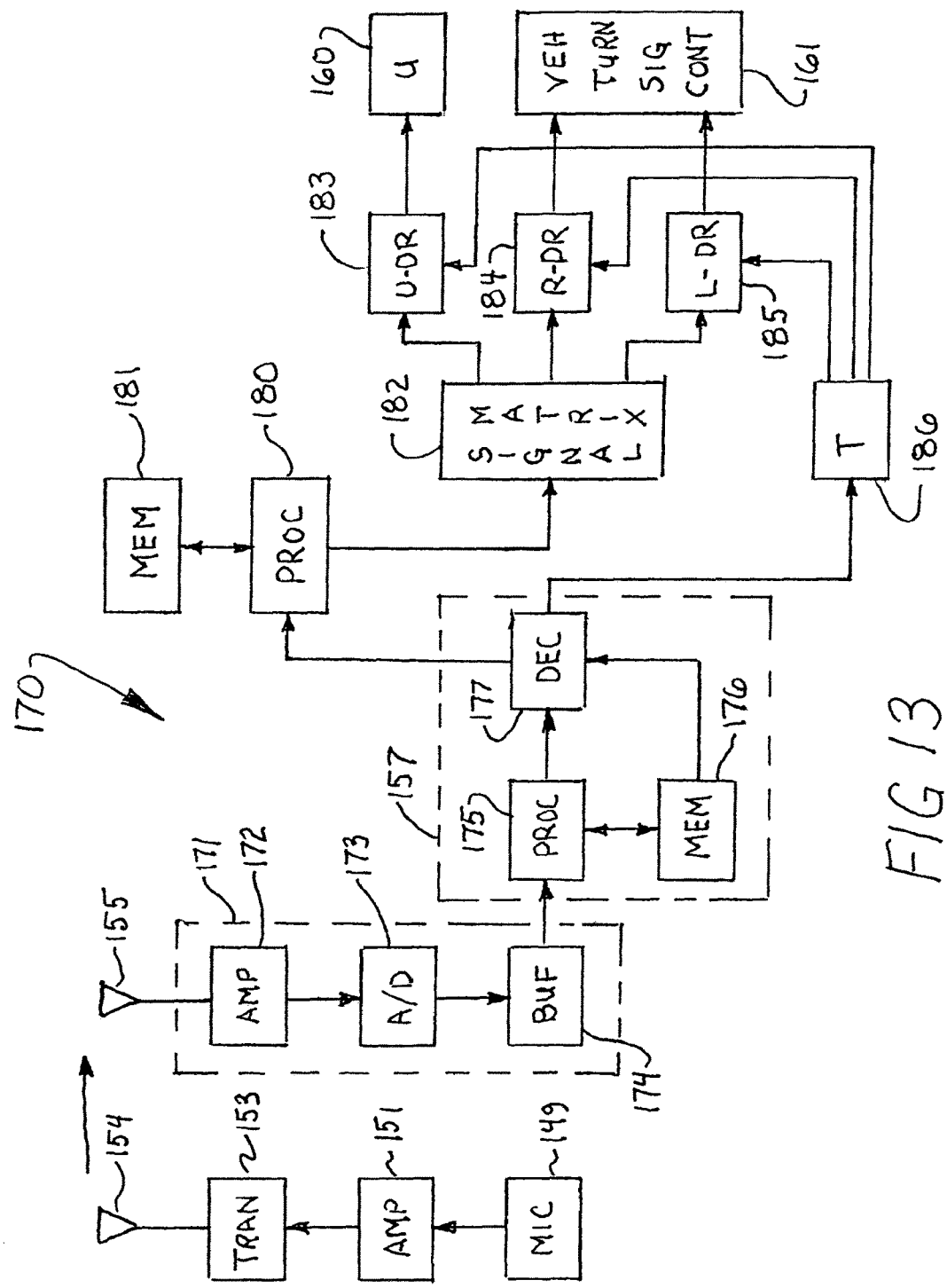
FIG. 13 sets forth a block diagram of a vehicle safety device constructed in accordance with the present invention showing further details of the operative system for aftermarket wireless voice recognition operation.
Figure 14:
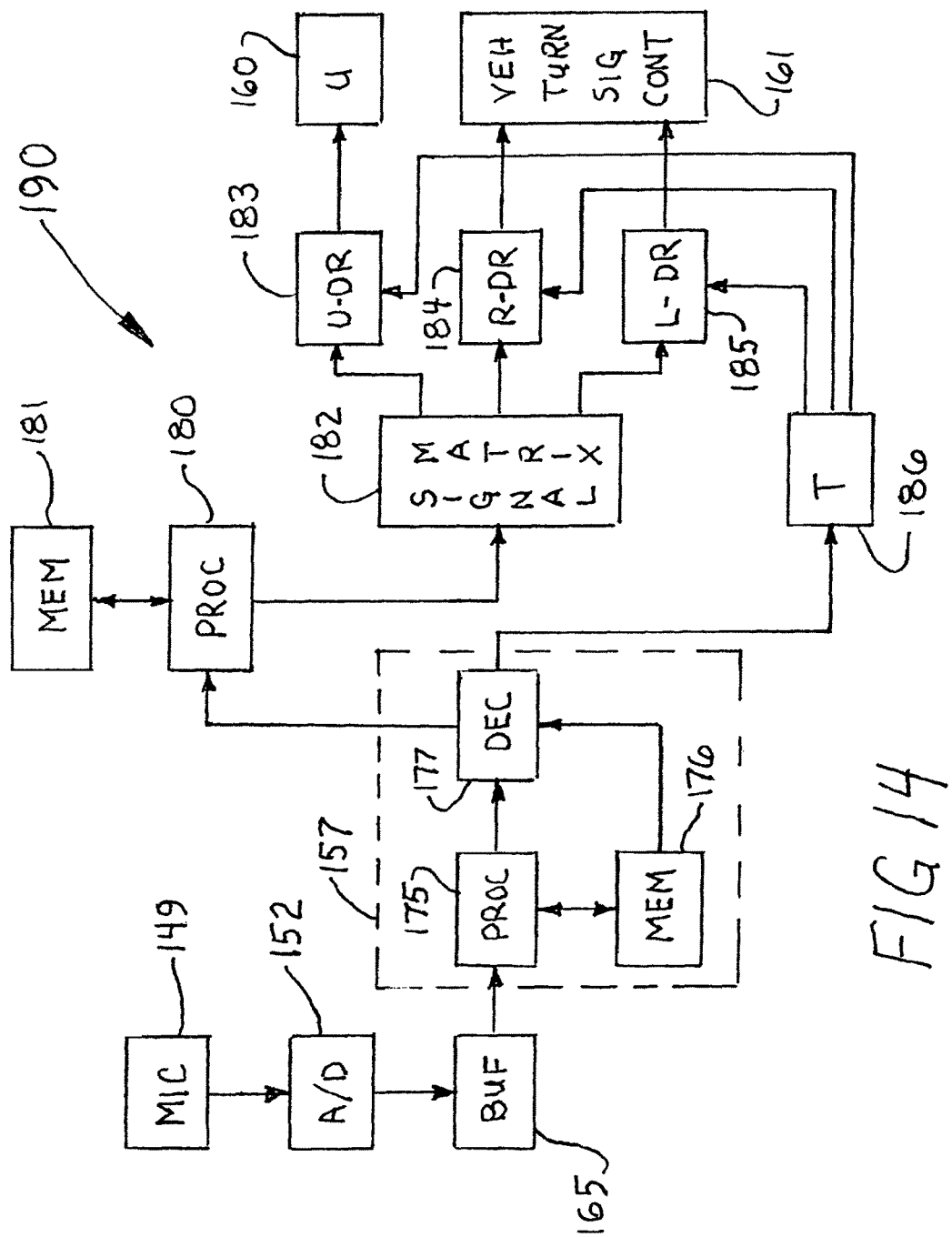
FIG. 14 sets forth a block diagram of an original equipment manufacturing embodiment of the present invention vehicle safety device utilizing voice recognition.

With temporary reference to FIGS. 13 and 14 together, it will be noted that each system uses a common circuit module which accommodates aftermarket original equipment manufacturer and dealer installed uses of the present invention system. This commonality renders the inventive system as more efficiently utilized. Thus, the common circuitry and the reversible U-turn indicator (seen in FIG. 6) provides a basic system adaptable to a number of uses.

FIG. 13 sets forth a further embodiment of the present invention system in greater detail. The system shown in FIG. 13 comprises an aftermarket, wireless, voice recognition embodiment of the present invention system generally referenced by numeral 170. For purpose of illustration, system 170 utilizes the transmission of signals between the transmitting unit and receiving unit which comprise analog voice signals modulated upon a suitable carrier. In contrast, the embodiments of the present invention shown in FIGS. 12 and 14 set forth systems which convert the voice signals to digital signals prior to modification and transmission. The use of analog modulated voice signals or digital modulated voice signals is a matter of variation of the present invention system and one or the other may be utilized to suit a particular environment or system need without departing from the spirit and scope of the present invention. Thus, system 170 includes a microphone 149 coupled to an amplifier 151 which in turn is coupled to a transmitting circuit 153. The output of transmitting circuit 153 is coupled to a transmitting antenna 154. System 170 further includes a receiving circuit 171 having a receiving antenna 155 coupled to an amplifier 172 which in turn is coupled to an analog to digital converter 173 the output of which is coupled to a data buffer 174.

In operation, spoken commands detected by microphone 149 are increased in power by amplifier 151 and applied to transmitting circuit 153. By conventional modulation techniques, transmitting circuit 153 modulates the amplified voice signals fixed upon a convenient carrier signal which is transmitted from antenna 154 and received by antenna 155. The received modulated signal at antenna 155 is coupled to an amplifier/demodulator 172 which recovers the voice information signals from the transmitting carrier. The voice signals are then converted from analog to digital signals by converter 173 and stored within a buffer 174. In this manner, voice commands received by microphone 149 are transmitted to the receiving unit and converted to digital voice signals stored within buffers 174.

A voice recognition system 157 includes a voice recognition processor 175 having an associated memory 176 together with a decoding circuit 177. Decoding circuit 177 is also coupled to memory 176. A system processor 180 includes an associated memory 181 and is operatively coupled to decoding circuit 177. The output of processor 180 is coupled to a signal matrix 182. Matrix 182 provides output signals to a U-turn signal driver 183, a right turn signal driver 184 and a left turn signal driver 185. The output of U-turn signal driver 183 is coupled to a U-turn signaling device 160 while the outputs of right turn signal driver 184 and left turn signal driver 185 are coupled to a vehicle turn signal control 161. A timer 186 is coupled to the output of decoding circuit 177 and provides timing signals coupled to drivers 183, 184 and 185.

In operation, the voice data signals stored within buffer 174 are coupled to voice recognition processor 175. Processor 175 and decoder circuit 177 cooperate with memory 176 to interpret the applied voice command signals and produce output command signals for application to processor 180. Among the functions performed by voice recognition processor 175, decoder 177 and memory 176 the above-mentioned processes of determining the presence or absence of a command keyword as well as voice recognition characteristic of an authorized user are performed. In essence then, processor 175 together with memory 176 and decoder 177 perform the initial evaluation of the voice signals as to authorized use and command structure to screen out extraneous voice communications and avoid unintended operation of the signaling system.

Processor 180 together with memory 181 performs system operations upon the received decoded signals from decoding circuit 177 and interoperates the signals to separate signals intended for operation of the U-turn signaling apparatus as well as right and left turn signaling apparatus. Toward this end, the process signals of processor 180 are routed by signal matrix 182 to the appropriate one of drivers 183, 184 or 185.

Concurrently, decoding circuit 177 also initiates the operation of timer 186 when transferring signals to processor 180. In response, timer 186 activates signal drivers 183, 184 and 185 for a predetermined time interval after which timer 186 deactivates drivers 183, 184 and 185. In this manner, the signaling systems of the host vehicle are operated for a predetermined interval in response to each voice command. In addition and as is set forth below in the flow diagram of FIG. 15, the system preferably employs a stop command recognition capability which allows the user to command a stop and thus terminate signal operation regardless of the condition of timer 186.

Thus, system 170 provides aftermarket installation of the present invention system within a existing manufactured vehicle with appropriate connection to the vehicles turn signaling apparatus as referenced by numeral 161. In addition, system 170 utilizes a supplemental U-turn signal apparatus 160 which may be added to the vehicle in accordance with the above-described embodiments.

FIG. 14 sets forth a further embodiment of the present invention system configured to provide and original equipment manufacture voice recognition system. As with the above systems such as system 150 shown in FIG. 12, the system shown in FIG. 14 generally referenced by numeral 190 includes a microphone 149 for receiving voice commands and converting the voice commands to electrical signals. System 190 further includes an analog to digital converter 152 coupled to a buffer 165. The output of buffer 165 is coupled to a voice recognition system 157. Thus, the input applied to voice recognition 157 of system 190 includes digitally encoded voice command signals detected by microphone 149. Buffer 165 provides appropriate data rate communication input to voice recognition system 157.

In operation, spoken commands detected by microphone 149 are increased in power by amplifier 151 and applied to transmitting circuit 153. By conventional modulation techniques, transmitting circuit 153 modulates the amplified voice signals fixed upon a convenient carrier signal which is transmitted from antenna 154 and received by antenna 155. The received modulated signal at antenna 155 is coupled to an amplifier/demodulator 172 which recovers the voice information signals from the transmitting carrier. The voice signals are then converted from analog to digital signals by converter 173 and stored within a buffer 174. In this manner, voice commands received by microphone 149 are transmitted to the receiving unit and converted to digital voice signals stored within buffers 174.

A voice recognition system 157 includes a voice recognition processor 175 having an associated memory 176 together with a decoding circuit 177. Decoding circuit 177 is also coupled to memory 176. A system processor 180 includes an associated memory 181 and is operatively coupled to decoding circuit 177. The output of processor 180 is coupled to a signal matrix 182. Matrix 182 provides output signals to a U-turn signal driver 183, a right turn signal driver 184 and a left turn signal driver 185. The output of U-turn signal driver 183 is coupled to a U-turn signaling device 160 while the outputs of right turn signal driver 184 and left turn signal driver 185 are coupled to a vehicle turn signal control 161. A timer 186 is coupled to the output of decoding circuit 177 and provides timing signals coupled to drivers 183, 184 and 185.

In operation, the voice data signals stored within buffer 174 are coupled to voice recognition processor 175. Processor 175 and decoder circuit 177 cooperate with memory 176 to interpret the applied voice command signals and produce output command signals for application to processor 180. Among the functions performed by voice recognition processor 175, decoder 177 and memory 176 the above-mentioned processes of determining the presence or absence of a command keyword as well as voice recognition characteristic of an authorized user are performed. In essence then, processor 175 together with memory 176 and decoder 177 perform the initial evaluation of the voice signals as to authorized use and command structure to screen out extraneous voice communications and avoid unintended operation of the signaling system.

Processor 180 together with memory 181 performs system operations upon the received decoded signals from decoding circuit 177 and interoperates the signals to separate signals intended for operation of the U-turn signaling apparatus as well as right and left turn signaling apparatus. Toward this end, the process signals of processor 180 are routed by signal matrix 182 to the appropriate one of drivers 183, 184 or 185.

Concurrently, decoding circuit 177 also initiates the operation of timer 186 when transferring signals to processor 180. In response, timer 186 activates signal drivers 183, 184 and 185 for a predetermined time interval after which timer 186 deactivates drivers 183, 184 and 185. In this manner, the signaling systems of the host vehicle are operated for a predetermined interval in response to each voice command. In addition and as is set forth below in the flow diagram of FIG. 15, the system preferably employs a stop command recognition capability which allows the user to command a stop and thus terminate signal operation regardless of the condition of timer 186.

Thus, system 190 provides an embodiment of the present invention system whereby the manufacturer of a vehicle is able to install a voice responsive hands free control system for operating the turn signals of the host vehicle together with a U-turn signal indicator. It will be apparent to those skilled in the art that the use of system 190 within vehicle manufacturer affords the vehicle manufacturer the opportunity to install the system in an optimum manner.

Figure 15:
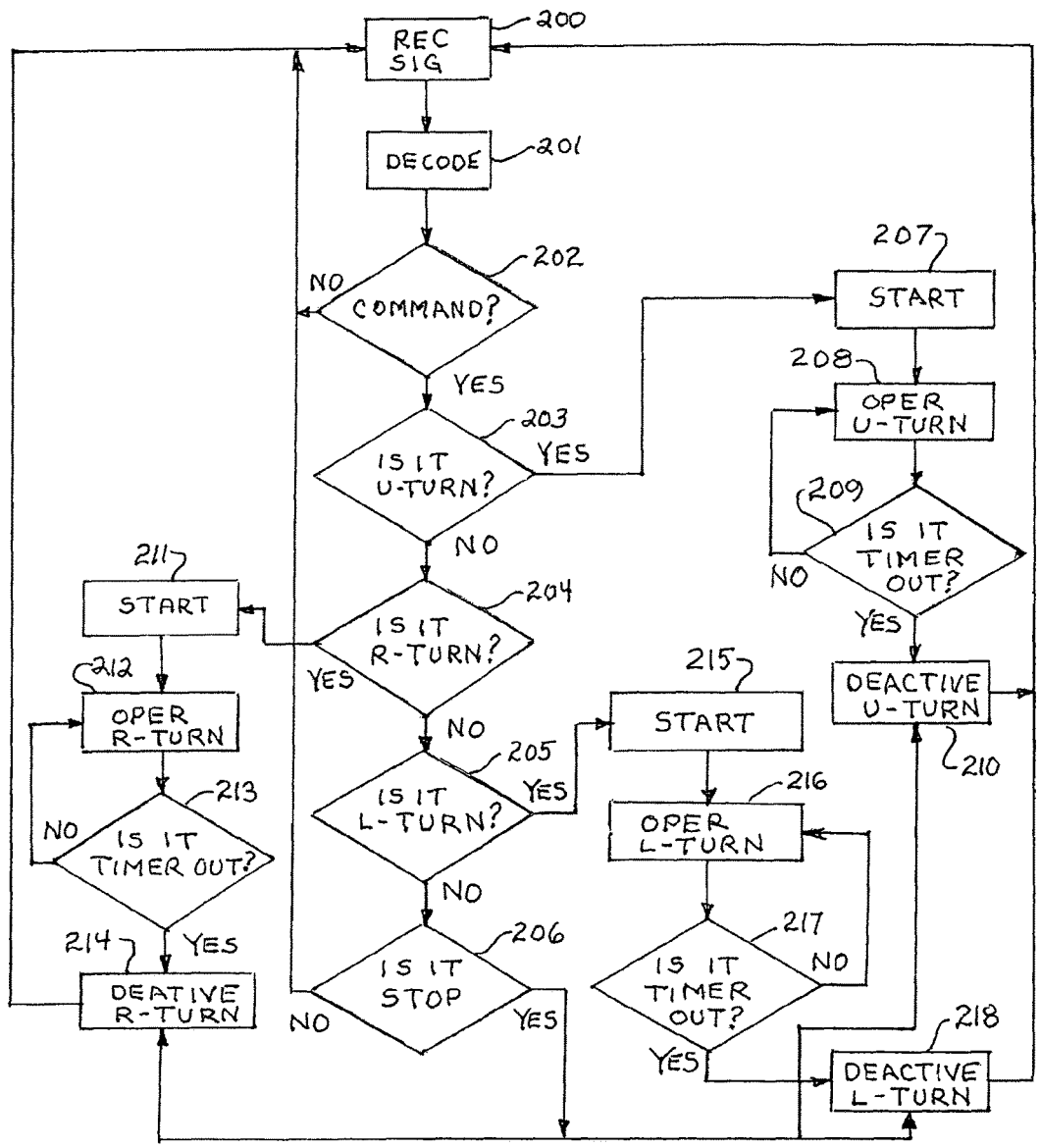
FIG. 15 sets forth a flow diagram of the operation of the present invention vehicle safety device voice recognition system.

FIG. 15 sets forth a flow diagram of the operation of the present invention system as shown in FIGS. 12, 13 and 14. The system operation in FIG. 15 contemplates the provision within the processor software for stored instructions which facilitate the use of voice recognition, voice activation and command interpretation using keyword activation. In addition, the system operation set forth in FIG. 15 further contemplates the above-mentioned use of a "stop" word which immediately terminates signal function despite the condition of timers within the signaling system.

More specifically, the operation shown in FIG. 15 is initiated at a step 200 in which the system awaits voice commands from the user. When voice information is detected at step 200, the system moves to step 201 and decodes the voice information received. The decoding at step 201 includes the above-described voice recognition which determines whether the voice information is provided by an authorized user. As mentioned above, the use of voice recognition and limitation of system operation to one or more authorized users avoids a great deal of unintentional inadvertent voice command triggering of the signal system. Following the decoding and authorization of user, operations performed at step 201 the voice information is applied to step 202 at which a determination is made as to whether the required command or keyword is present. As mentioned above, the use of a keyword such as "command" at the initiation of voice commands further avoids inadvertent signaling system operation. In the example shown in FIG. 15 and mentioned above, the keyword "command" is utilized. In such operation, the present invention system ignores and will not respond to apparent voice commands which are not initiated by the keyword "command". Thus, if at step 202 the keyword "command" is not detected the system returns to step 200 and awaits the next voice input. If however, the keyword is present in the voice signal, the system moves to step 203 for a determination as to whether the voice command requires U-turn signaling. In the event U-turn signaling is not indicated, the system moves to step 204 and determines whether the command indicates a right turn signal operation. In the event right turn signal operation is not indicated, the system moves to step 205 and determines whether left turn signal operation is commanded. In the event left turn signal operation is not indicated, the system moves to step 206 for a determination of the presence of a stop command. As mentioned above, the present invention system preferably utilizes a stop command capability which allows the user to terminate system operation regardless of timer status or ongoing signal operation. In the event a stop command is found at step 206, the system moves to steps 214, 218 and 210 in which the activation of all signaling apparatus is terminated. In the event a stop command is not found at step 206, the system returns to step 200 and awaits the next voice command.

In the event a U-turn command is detected at step 203, the system moves to step 207 and initiates timer operation. Thereafter the system moves to step 208 and initiates the operation of the U-turn signaling system. Following step 208, the system moves to step 209 and determines whether the timer has timed out. In the event the timer has not timed out, the system returns to step 208 operating the U-turn signal apparatus. Once a determination is made at step 209 that the timer interval has timed out, the system moves to step 210 and deactivates the U-turn signaling apparatus. Thereafter, the system returns to step 200 awaiting the next voice command.

In the event a determination is made at step 204 that a right turn signal command is present, the system moves to step 211 and starts timer operation. Following timer operation, the system moves to step 212 and operates the right turn signaling apparatus. Thereafter, the system determines at step 213 whether the timer interval has timed out. In the event the timer interval has not timed out, the system returns to step 212 and continues to operate the right turn apparatus. Once the timer has timed out, the system moves to step 214 and the right turn signaling apparatus is deactivated.

In the event a determination is made at step 205 that a left turn command is present, the system operates in the above-described manner through steps 215, 216 and 217 to operate the left turn signaling apparatus for a predetermined timer interval and thereafter moves to step 218 t deactivate left turn signaling.

Figure 16:
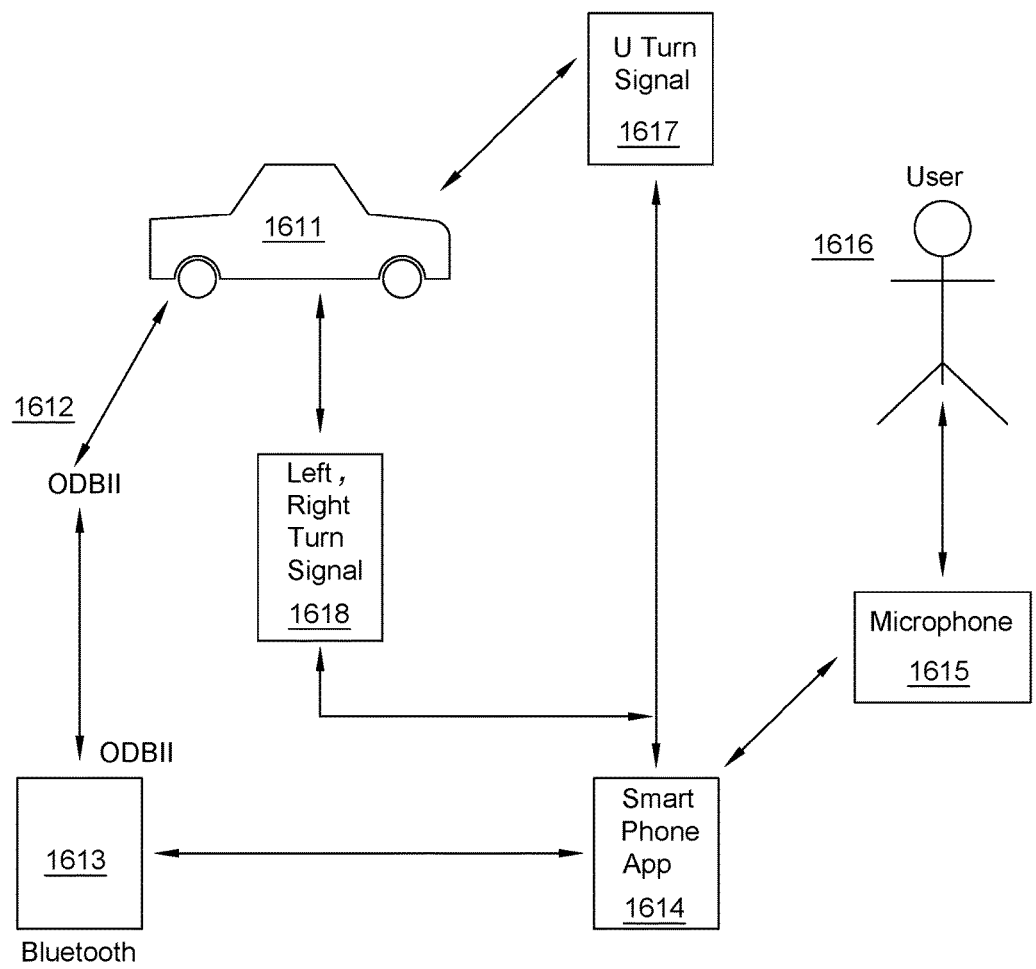
FIG. 16 sets forth a flow diagram of an embodiment of the present invention vehicle safety device FIG. 17 sets forth a flow diagram of an embodiment of the present invention vehicle safety device FIG. 18 sets forth a flow diagram of an embodiment of the present invention vehicle safety device FIG. 19 sets forth a flow diagram of an embodiment of the present invention vehicle safety device

Modern vehicles have central computer that controls from the engine operation to the body sensors, yaw sensors, suspension sensors and even light signals. All these controlling functions can be overwritten with new code instructions through the vehicle's ODB port. Majority of the modern vehicles have ODBII port for access to the central CPU to access the instruction. The new embodiment of the invention includes an application embedded in the iPhone or Google phone where, acting as a phone app, it has a voice recognition module to detect voice command from the user via the phone's microphone and convert the command into digital command and instruct the vehicles' left and right turn signals to activate or terminate via new instruction sent to the CPU of the vehicle via the ODBII port. Generally the access to the ODBII port is via wireless link by Bluetooth link from the iPhone where command is communicated to the ODB wireless module. FIG. 16 sets forth a flow diagram of the sequence of system operation for the present invention voice activated embodiments by which the system is able to be embedded within the vehicles existing ODB system. In one aspect of the invention, a signal apparatus is disclosed comprising of a vehicle 1611 where the vehicle 1611 is equipped with an on-board computer and has a ODBII port 1612. In conjunction with said vehicle 1611 it is provided that there be a Bluetooth device 1613 which is connectable to the ODBII port and a computer platform on a smart phone 1614 wherein on said platform a application exists or may be installed which can connect to the Bluetooth device 1613 via Bluetooth as well as access the smart phone's existing microphone 1615. By utilizing the smart phone's micro-phone, the app is able to listen for key command triggers from the user 1616 such as "turn left", or "turn right" or "U-turn", and upon receiving and identifying a key command trigger, the app initiates the signal request 1618 to the vehicle via the ODBII connection 1612.

Further, in this one aspect of the invention, the system also has as a component, a physical U-turn signal indicator 1617 which is a portable device that is to be placed inside the vehicle's passage cabin such that it is viewable for the read of the vehicle. This U-turn signal indicator 1617 is connected to the smart phone app 1614 via a Bluetooth connection as well.

Figure 17:
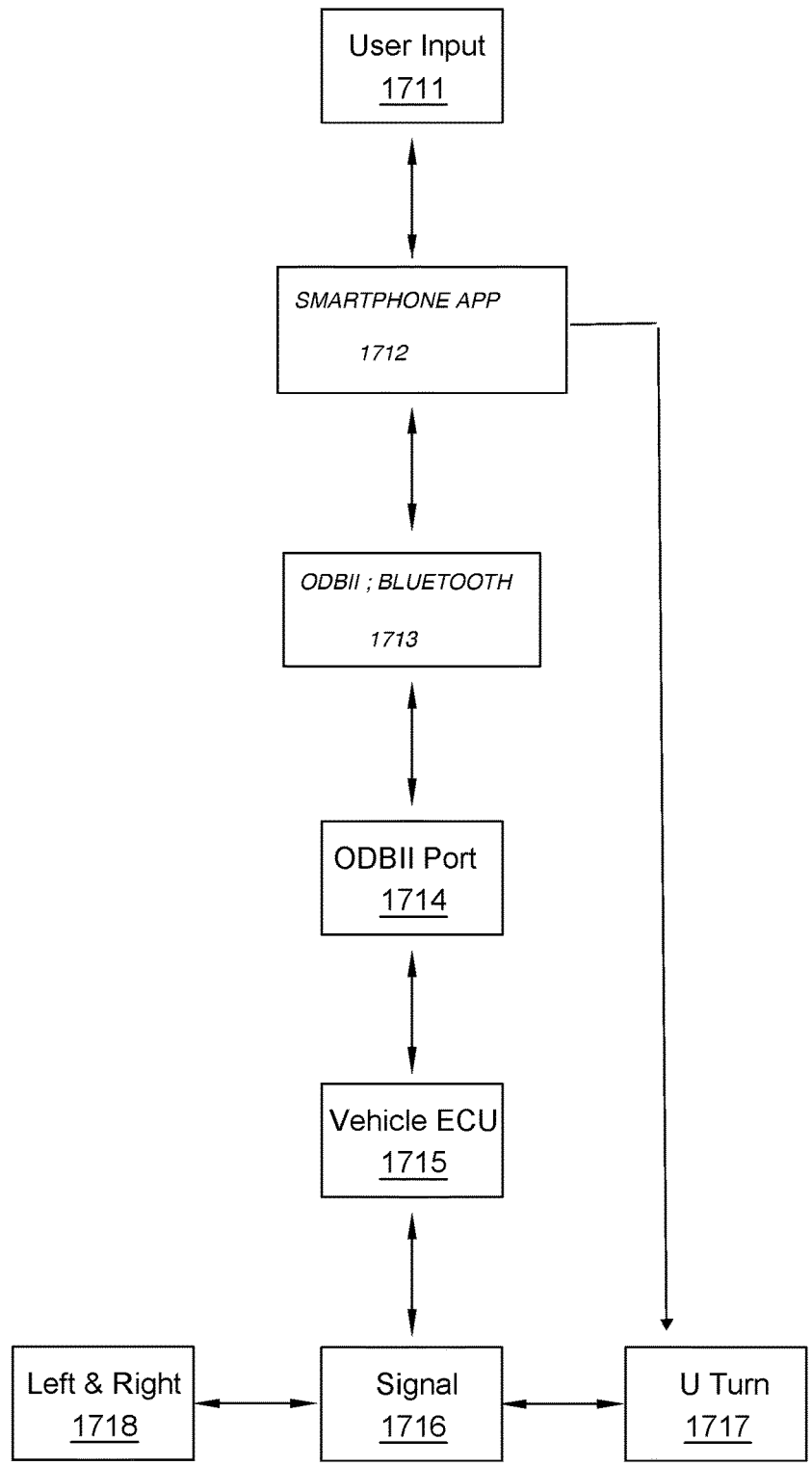

Referring now to FIG. 17, in one aspect of the invention it is set forth a flow diagram showing the sequence of system operation for the present invention voice activated embodiments disclosed in FIG. 16 by which the system is able to receive a 1711 user's input of a key command that is decoded through 1712 the smart app. Once the app decodes the proper words 1713 the ODBII Bluetooth device sends the signal to the rest of the vehicle through the 1714 ODBII port on board the present 1715 vehicle. The vehicle triggers the 1716 light signals 2017 U-turn and the 2018 left and right turn signals.

Figure 18:
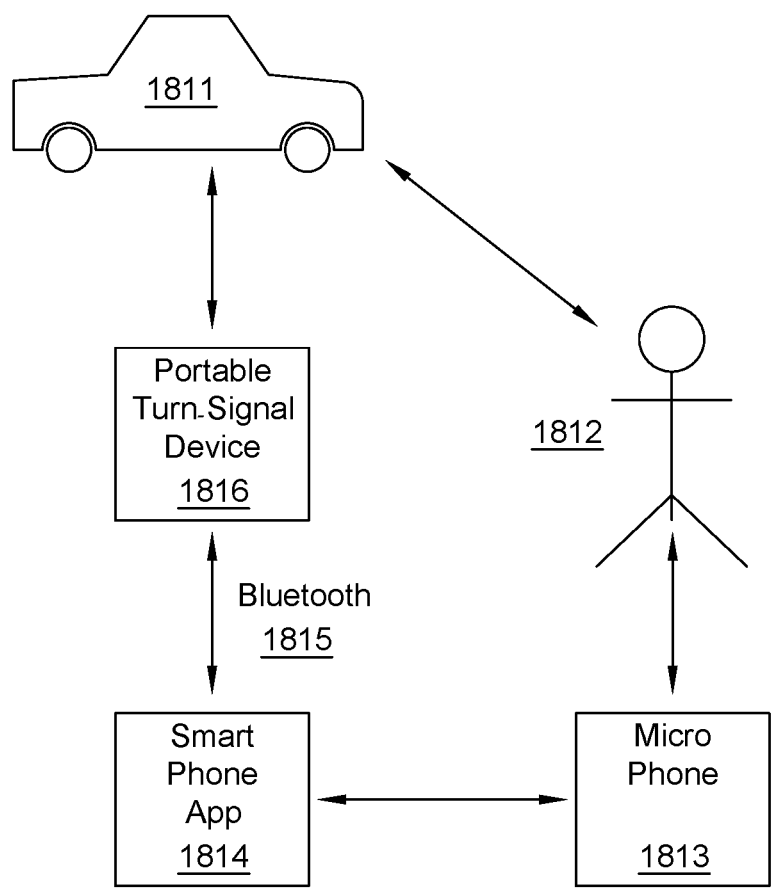

Some of the older vehicles does not have central computer that controls the light signals. The new embodiment of the invention includes an application embedded in the iPhone or Google phone where, acting as a phone app, it has a voice recognition module to detect voice command from the user via the phone's microphone and convert the command into digital command and instruct the left and right turn signals to activate or terminate via new instruction sent to externally constructed left turn, right turn and U-turn signal apparatus. So in the package of the present invention, the system is comprised of a platform hosted on a smart phone computer where external light signal apparatuses are coupled to the platform via wireless Bluetooth link. Referring now to FIG. 18, in one aspect of the invention it is disclosed and set forth a flow diagram of the sequence of system operation for the present invention voice activated embodiments by which the system is able to interact with portable light kit components that are not integrated with the vehicle ECU. Here, the apparatus is comprised of a vehicle 1811 and a user 1812 and a smart phone which by Bluetooth connectivity is able to communicate directly with portable turn signal devices which are paired as "left turn", "right turn" and "u-turn" and physically placed around the vehicle as necessary such that they are able to effectuate signaling to other drivers and pedestrians. The microphone 1813 of the phone receives the audible commands from the user 1812, which in turn, by way of the app, then issues commands to the portable turn signal device 1816 once the key command has been identified and decoded, indicating the turning maneuver the user 1812 intends to commence.

Figure 19:
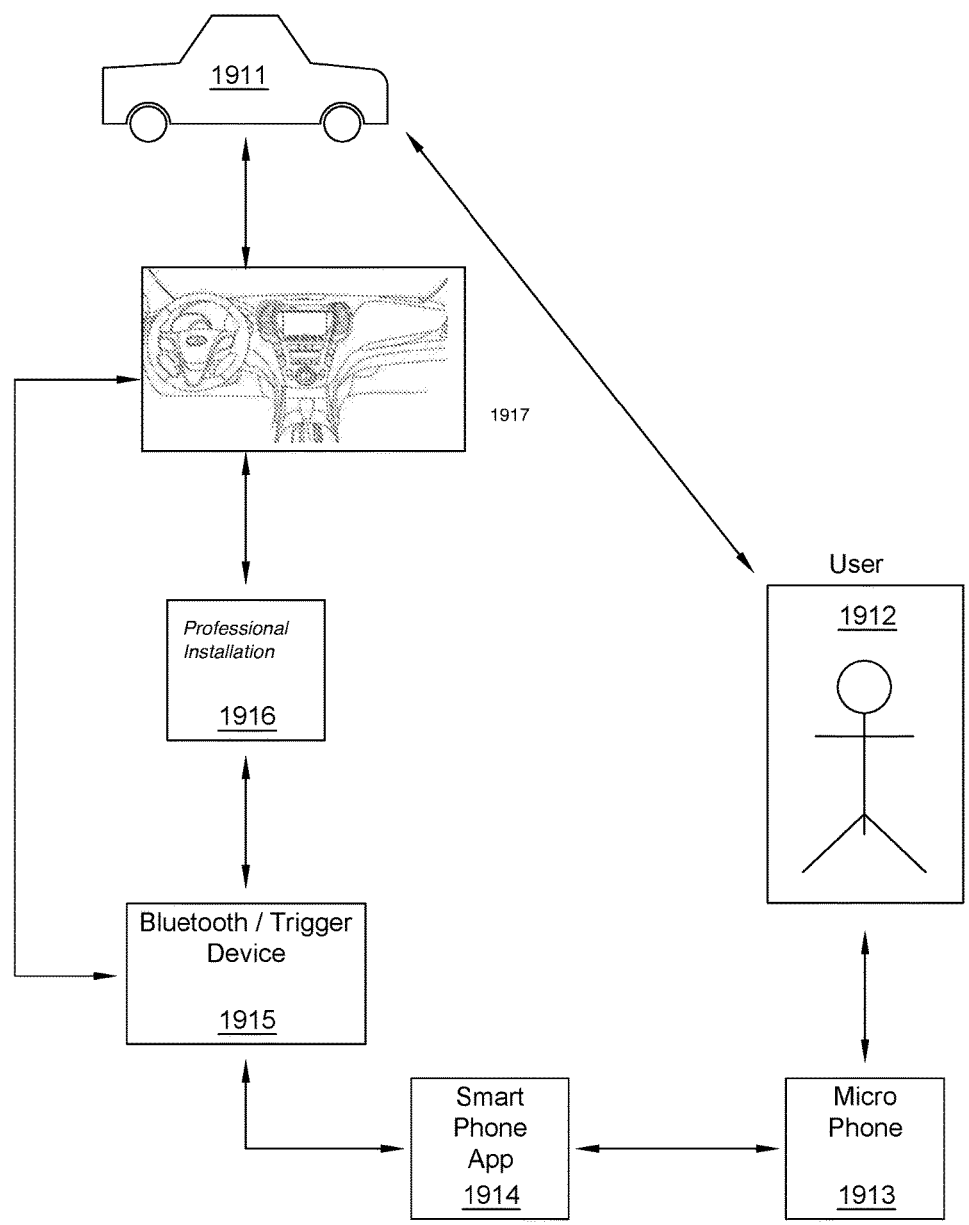

As stated above, some of the older vehicles does not have central computer that controls the light signals. The new embodiment of the invention includes an application embedded in the iPhone or Google phone where, acting as a phone app, it has a voice recognition module to detect voice command from the user via the phone's microphone and convert the command into digital command and instruct the left and right turn signals to activate or terminate via new instruction sent to externally constructed switching device. The purpose of the switching device is by piggy-back the connecting the switching device to the vehicle's original left and right turn activation switch, the switching device can activate the vehicle's original left and right turn signal base on the instruction of the switching device which receives its instruction via wireless Bluetooth link from the platform or app as hosted on the smart phone. FIG. 19 sets forth a flow diagram of the sequence by which, in one aspect of the invention, a vehicle, because the ECU is not assessable or because it is preferable otherwise, a Bluetooth trigger device 1915 is instead wired serially with the vehicles turn signal switches such that instead of by way of the ODBII interactivity as discussed above, the Bluetooth trigger device 1915 serves to interact with and activate the left and right turn signals of the vehicle. In this embodiment, the user 1912 gives command to the integrated microphone 1913 of the smartphone which hosts the platform of app 1914 which is connected via Bluetooth to the Bluetooth trigger device 1915. The Bluetooth trigger device contemplated here, because it needs to be physically with the wiring of the cars existing turn signal activation apparatus of the vehicle 1917 will likely necessitate professional installation by car mechanics 1916. As with the above described embodiments of the invention, in this embodiment, once the key command has been identified and decoded the app sends a signal to activate the appropriate turn light. However, here, the signal instead of being sent to the vehicle ECU is sent to the Bluetooth trigger device, which then reacts and activates the desired turn-signal.

What has been shown is a novel voice responsive vehicle signaling apparatus which may be used in aftermarket and original equipment manufacturing applications. The system provides hands free voice responsive and voice recognition capability allowing the user to maintain full attention to driving activities and vehicle operation. In one other embodiment, the same invention can be applied to other vehicular functions such as activation of wipers, activation of cruise control, activation of temperature control. Specifically, these functions can be controlled through the same invention disclosed here via ODBII modification. In yet another embodiment, the phone can act as dash camera and the function can be integrated with the current system and capable of storing video feed in the Cloud using the smartphone's wireless connectivity.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in a vehicle, a voice operated signal system comprising: a platform hosted by a smart phone computer; a microphone on the smart phone for converting audible information to voice signals; a voice recognition system for decoding said voice signals and producing activation signals corresponding to a U-turn signal, a right turn signal and a left turn signal commands within said voice signals; a on-board diagnostics II (ODBII) connector that connects to a vehicle via a ODBII port of said vehicle; said ODBII connector is coupled to said platform wirelessly via Bluetooth; a voice activation module activates said left turn signal and said right turn signal via said ODBII port; an external U-turn light apparatus; said voice activation module send said U-turn signal command to said external U-turn apparatus; said external U-turn light apparatus is coupled to said platform via Bluetooth; wherein said voice commands each include a command word common to all of said voice commands and wherein said voice recognition system includes a coupling means for responding solely to said voice commands including said command words.

* * * * *